(12) United States Patent
Wallman et al.

(10) Patent No.: US 7,096,467 B2
(45) Date of Patent: Aug. 22, 2006

(54) INITIALIZATION OF JAVA CLASSES IN JAVA VIRTUAL MACHINE ENVIRONMENTS

(75) Inventors: David Wallman, Sunnyvale, CA (US); Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 733 days.

(21) Appl. No.: 09/895,772

(22) Filed: Jun. 28, 2001

(65) Prior Publication Data
US 2003/0005020 A1 Jan. 2, 2003

(51) Int. Cl.
*G06F 12/00* (2006.01)
(52) U.S. Cl. .......................... 718/1; 718/104; 707/206
(58) Field of Classification Search ................ 717/155, 717/128; 718/1, 104; 707/206
See application file for complete search history.

(56) References Cited

U.S. PATENT DOCUMENTS 5,973,702 A * 10/1999 Orton et al. ................ 345/619
6,093,216 A * 7/2000 Adl-Tabatabai et al. .... 717/128
6,675,379 B1 * 1/2004 Kolodner et al. ........... 717/155

OTHER PUBLICATIONS

Lindholm et al., "The Java™ Virtual Machine Specification," (Sep., 1996), Sun Microsystems, Inc., Chapters 1-10 (173 pp.).

* cited by examiner

*Primary Examiner*—William Thomson
*Assistant Examiner*—Qing-Yuan Wu
(74) *Attorney, Agent, or Firm*—Beyer Weaver & Thomas LLP

(57) ABSTRACT

Techniques for initialization of Java classes are disclosed. As such, the techniques can be implemented in a Java virtual machine to initialize Java classes represented in Java class files. A Java class loader suitable for loading class files into the Java virtual machine is disclosed. As will be appreciated, the Java class loader facilitates loading and execution of the Java initialization methods that need to be executed in order to initialize Java classes. Moreover, the Java class loader operates to remove the Java initialization methods after they have been executed and no longer serve a useful purpose. This means that the virtual machine can utilize its memory space more efficiently. As a result, the performance of virtual machines, especially those operating with limited resources is improved.

15 Claims, 4 Drawing Sheets

INITIALIZATION OF JAVA CLASSES IN JAVA VIRTUAL MACHINE ENVIRONMENTS

BACKGROUND OF THE INVENTION

The present invention relates generally to object-based high level programming environments, and more particularly, to techniques suitable for initialization of Java classes in Java computing environments.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet which allows communication between diverse computer platforms through a graphical interface. Computers communicating over the Web are able to download and execute small applications called applets. Given that applets may be executed on a diverse assortment of computer platforms, the applets are typically executed by a Java™ virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The methods portion 108 can include or have references to several Java methods associated with the Java class which is represented in the class file 100. One of these methods is an initialization method used to initialize the Java class after the class file has been loaded by the virtual machine but before other methods can be invoked. In other words, various initialization methods are used to initialize various Java classes before these classes can be used.

One problem with the conventional approaches for initializing Java classes is that the initialization methods remain loaded in the virtual memory even after they have been executed. In other words, although the initialization method is executed only once, conventional virtual machines continue to store them in their memory. As will be appreciated, numerous Java classes may be loaded into a virtual machine. In some cases, the initialization method can be a complex process which takes up a significant portion of the memory. This, of course, can result in a grossly inefficient use of system resources. In some circumstances, particularly in systems with limited computing power and/or memory, this inefficient use of resources is a serious disadvantage.

In view of the foregoing, improved techniques for initialization of Java classes are needed.

SUMMARY OF THE INVENTION

Broadly speaking, the invention relates to techniques for initialization of Java classes. As such, the invention can be implemented in a Java virtual machine to initialize Java classes represented in Java class files. A Java class loader suitable for loading class files into the Java virtual machine is disclosed. As will be appreciated, the Java class loader facilitates loading and execution of the Java initialization methods that need to be executed in order to initialize Java classes. Moreover, the Java class loader operates to remove the Java initialization methods after they have been executed and no longer serve a useful purpose.

The invention can be implemented in numerous ways, including as a method, an apparatus, a computer readable medium, and a database system. Several embodiments of the invention are discussed below.

As a method for initializing Java classes in a Java class file suitable for loading by a Java virtual machine operating in a Java computing environment, one embodiment of the invention includes that acts of: loading a first initialization method associated with a first Java class into a memory portion of the virtual machine; executing the first initialization method after the initialization method has been loaded into the memory portion of the virtual machine; and deleting the first initialization method from the memory portion after the execution of the first initialization method has been completed.

As a Java virtual machine suitable for loading and execution of Java class files, another embodiment of the invention includes a Java class loader operating to load a first initialization method associated with a first Java class into a memory portion of the virtual machine. The first initialization method is capable of initializing the first Java class when executed. The virtual machine operates to execute the first initialization method after the initialization method has been loaded into the memory portion of the virtual machine, thereby initializing the first Java class. The virtual machine then deletes the first initialization method from the memory portion after the execution of the first initialization method has been completed.

As a computer readable medium including computer program code for initializing Java classes suitable for loading by a Java virtual machine operating in a Java computing environment, one embodiment of the invention includes: computer readable code for loading a first initialization method associated with a first Java class into a memory portion of the virtual machine, computer readable code for executing the first initialization method after the initialization method has been loaded into the memory portion of the virtual machine, and computer readable code for deleting the first initialization method from the memory portion after the execution of the first initialization method has been completed.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for initialization of Java classes. As such, the techniques can be implemented in a Java virtual machine to initialize Java classes represented in Java class files. A Java class loader suitable for loading class files into the Java virtual machine is disclosed. As will be appreciated, the Java class loader facilitates loading and execution of the Java initialization methods that need to be executed in order to initialize Java classes. Moreover, the Java class loader operates to remove the Java initialization methods after they have been executed and no longer serve a useful purpose. This means that the virtual machine can utilize its memory space more efficiently. As a result, the performance of virtual machines, especially those operating with limited resources, is improved.

Embodiments of the invention are discussed below with reference to FIGS. 2A–3. However, those skilled in the art will readily appreciate that the detailed description given herein with respect to these figures is for explanatory purposes only as the invention extends beyond these limited embodiments.

Figure 1A:
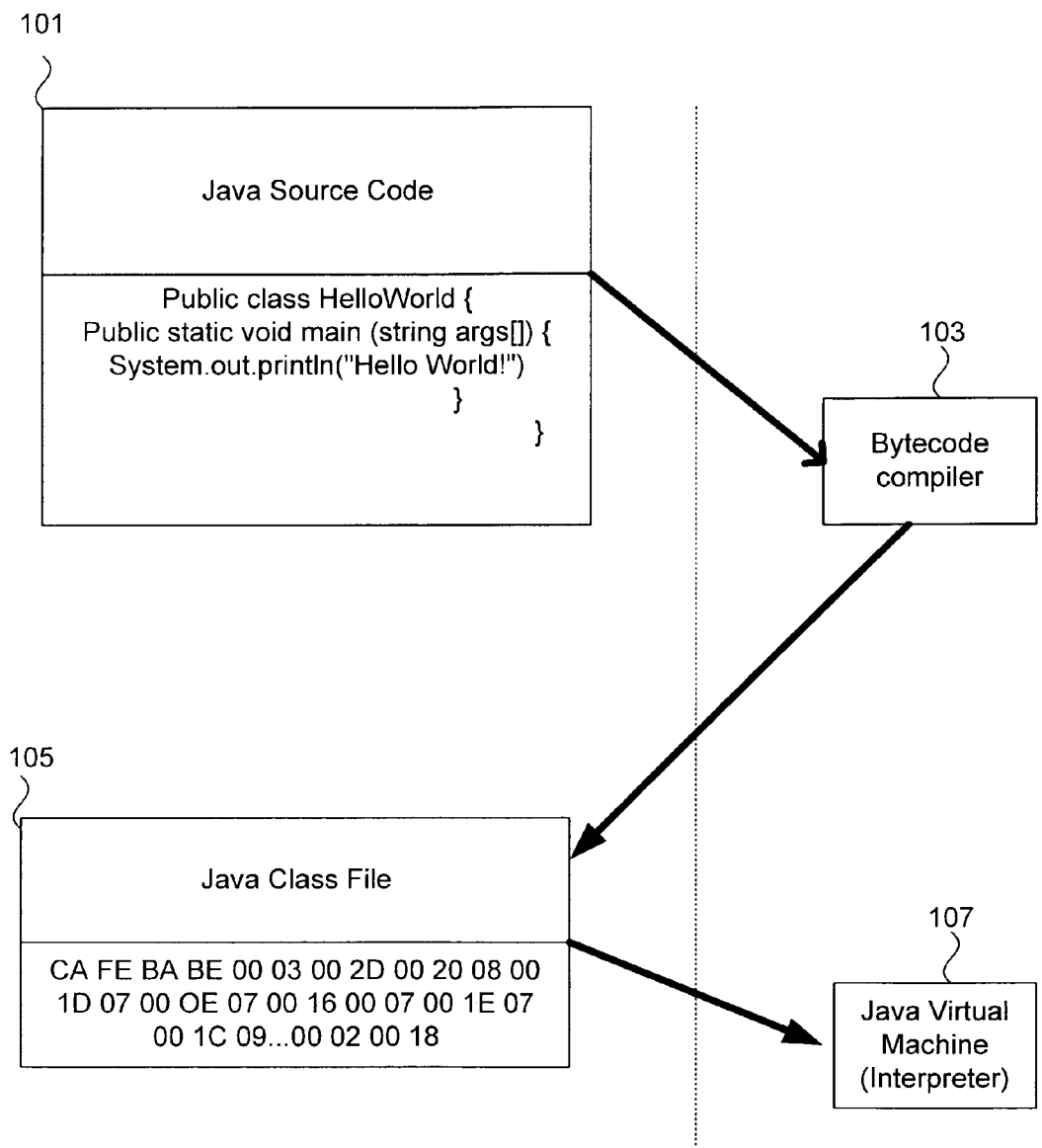
FIG. 1A shows a progression of a simple piece of a Java source code through execution by an interpreter, the Java virtual machine.
Figure 1B:
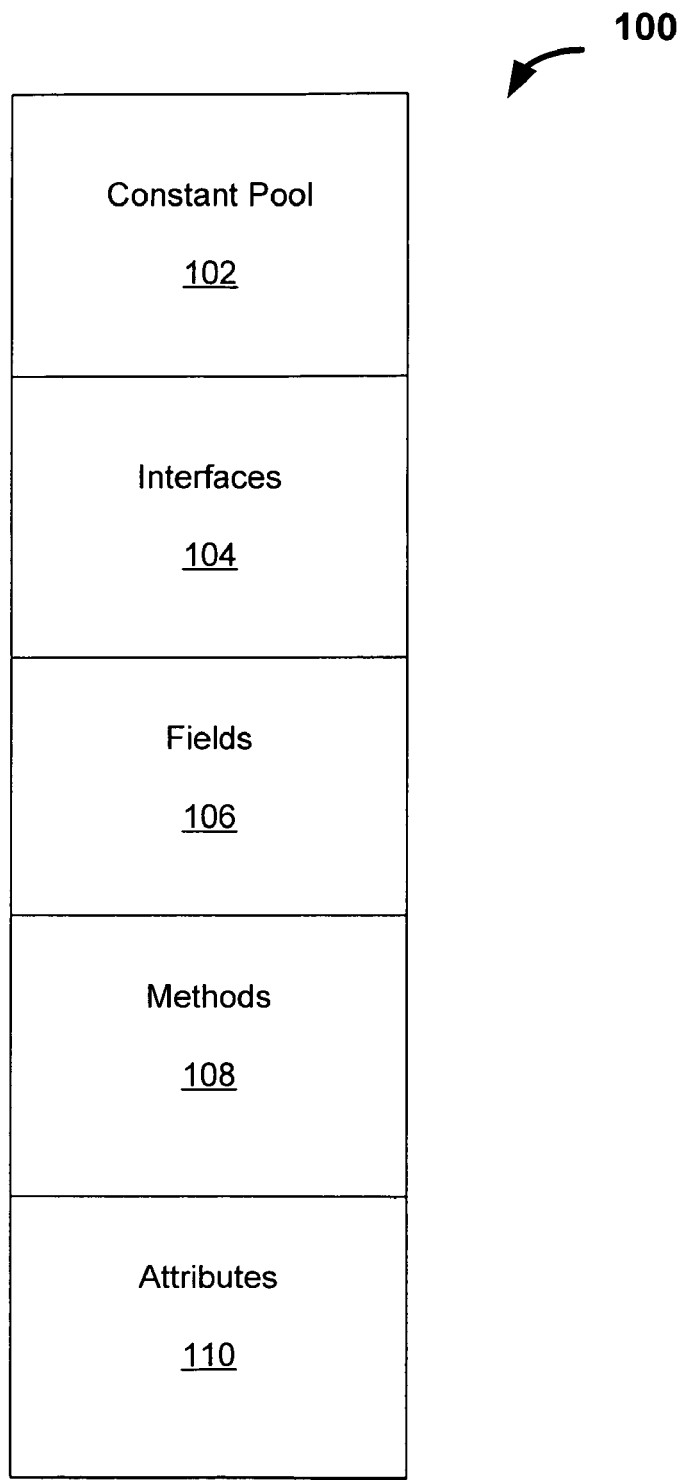
FIG. 1B illustrates a simplified class file.
Figure 2A:
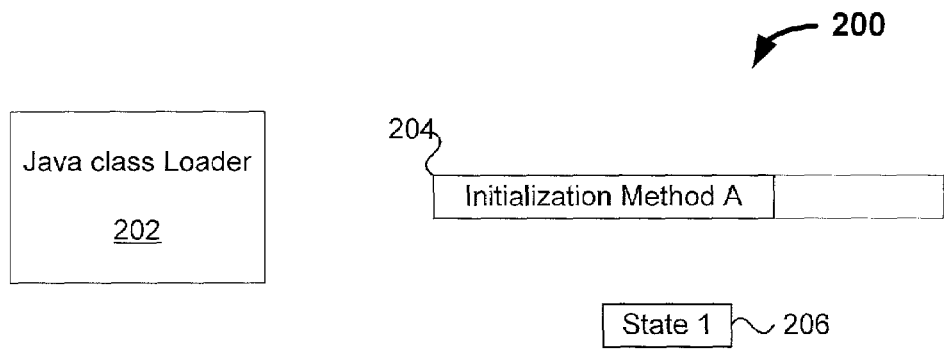
FIGS. 2A–C illustrate a Java computing environment in accordance with one embodiment of the invention.
Figure 2B:
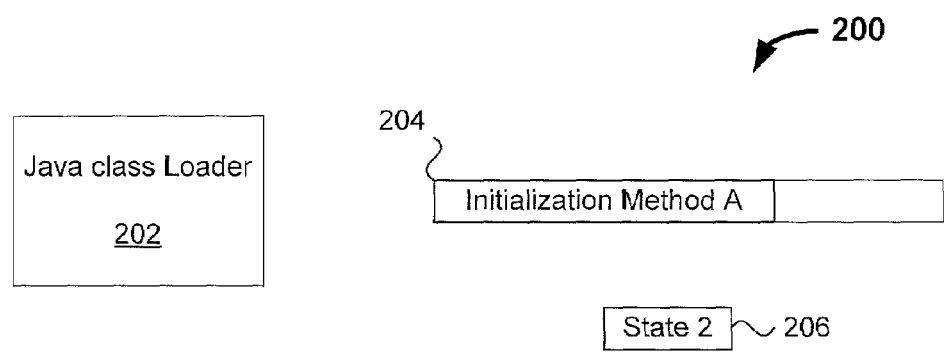
Figure 2C:
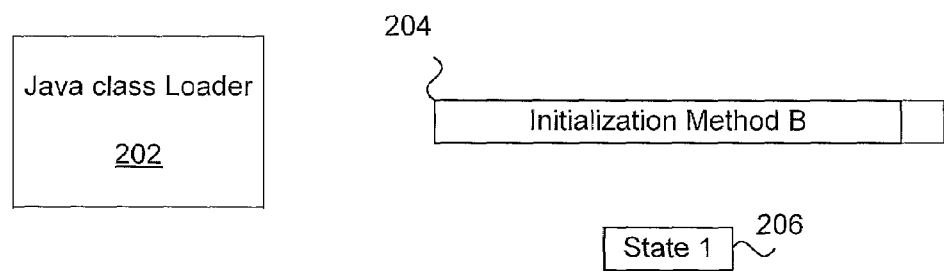

FIGS. 2A–C illustrate a Java computing environment 200 in accordance with one embodiment of the invention. The Java computing environment 200 includes a Java class loader 202 suitable for loading Java classes represented in a Java class file. As is known to those skilled in the art, conventional Java class loaders function to load Java class files into the virtual machine. The Java class loader 202 can perform this and other operations conventionally performed. However, as will be appreciated, unlike conventional Java class loaders, the Java class loader 202 operates to remove initialization methods from the memory of the virtual machine when they are no longer needed.

As shown in FIG. 2A, an initialization method A is stored in a memory portion 204. In the described embodiment, the memory portion 204 is a buffer allocated in the local memory of the Java class loader 202. It should be noted that in conventional virtual machines the initialization methods are typically stored in a portion of memory where all methods may be stored. Thus, an initialization method of a Java class can be in the same portion of memory as other methods associated with the Java class. Moreover, the initialization methods are not conventionally removed from the memory even after they are used and no longer serve a useful purpose.

After the Java class loader 202 has loaded the initialization method A into memory portion 204, the Java class loader 202 operates to set a monitor 206 to a first state, namely, state 1. As is known to those skilled in the art, the monitor (or log) 206 can be used as a synchronization mechanism which allows the virtual machine to know when the initialization method has been loaded and is ready for execution.

Referring to FIG. 2B, monitor 206 is set to a second state (state 2) when the initialization method A has been executed. In FIG. 2C, after the monitor 206 is set to state 2, the Java class loader 202 operates to load another initialization method, namely, initialization method B, into the memory portion 206. In other words, the Java class loader 202 operates to remove the initialization method A from the virtual machine by overwriting the load initialization method B in the memory portion 206. In this way, various initialization methods can be loaded, executed, and then removed from the virtual machine. This means that the virtual machine can utilize its memory space more efficiently. As a result, the performance of virtual machines, especially those operating with limited resources, is improved.

Figure 3:
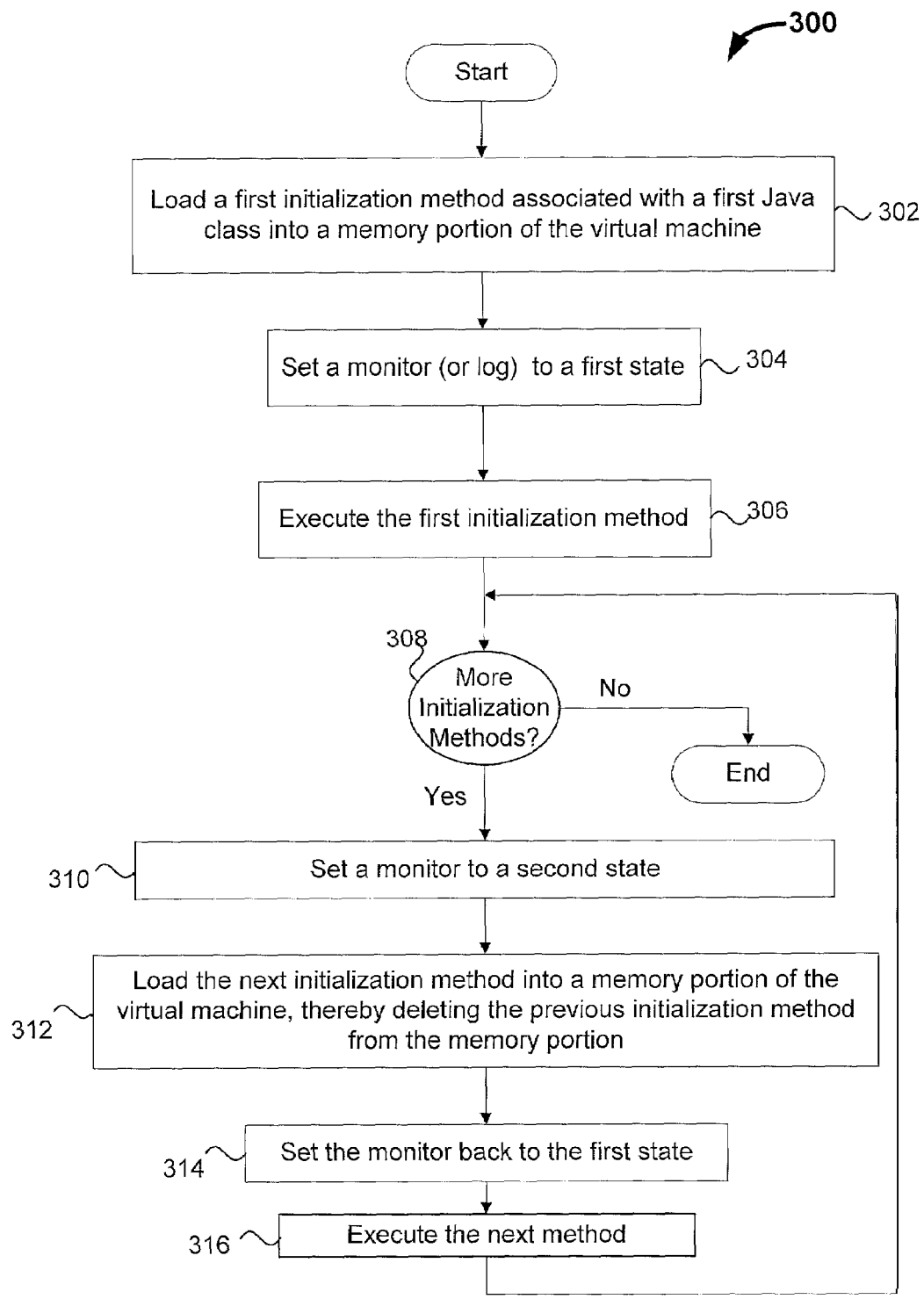
FIG. 3 illustrates a method for initializing Java classes in accordance with one embodiment of the invention.

FIG. 3 illustrates a method 300 for initializing Java classes in accordance with one embodiment of the invention. The Java classes are represented in Java class files that are loaded by the virtual machine. The method 300 can, for example, be used by the Java class loader 202 of FIGS. 2A–C. Initially, at operation 302, a first initialization method associated with a first Java class is loaded into a memory portion of the virtual machine. As noted above, the memory portion can be a buffer allocated in the local memory of the Java class loader. When executed, the first initialization method is capable of initializing the first Java class. Next, at operation 304, a monitor (or log) is set to a first state. Thereafter, at operation 306, the first initialization method is executed. After the execution of the first initialization method, the method 300 proceeds to operation 308 where a determination is made as to whether there are more initialization methods to execute. If it is determined at operation 308 that there is not at least one more initialization method to execute, the method 300 ends.

On the other hand, if it is determined at operation 308 that there is at least one initialization method to execute, the method 300 proceeds to operation 310 where the monitor is set to a second state. Next, at operation 312, the next initialization method is loaded into the memory portion of the virtual machine. It should be noted that by loading the next initialization method, the previous (e.g., the first initialization method) is deleted from the virtual machine. Thereafter, at operation 314, the monitor is set back to the first state. This means that the second initialization method can be executed. Accordingly, at operation 316, the next initialization method is executed. The method 300 then proceeds to operation 308 where a determination is made as to whether there are more initialization methods to execute. If it is determined at operation 308 that there is at least one more initialization method to execute, the method 300 proceeds to operations 310–316 in a similar manner as discussed above. When it is determined at operation 308 that there is not at least one more initialization method to execute, the method 300 ends.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. In a Java computing environment, a method of initializing Java classes in a Java class file suitable for loading by a Java virtual machine operating in the Java computing environment, said method comprising:
   by a Java class loader, loading a first initialization method associated with a first Java class into a memory portion of said Java virtual machine, said first initialization method capable of initializing said first Java class when executed;
   setting a monitor suitable for synchronization to a first state when said first initialization method has been loaded, wherein the monitor is usable as a synchronization mechanism to allow the Java virtual machine to know when the first initialization method has been loaded and is ready for execution;
   executing said first initialization method after said first initialization method has been loaded into said memory portion of said Java virtual machine, thereby initializing said first Java class;
   after the first initialization method has been executed, setting said monitor to a second state when said first initialization method has been executed; and
   by the Java class loader, deleting said first initialization method from said memory portion, based upon said monitor being in said second state, after said execution of said first initialization method has been completed, whereby the first initialization method is deleted independent of the loaded class.

2. A method as recited in claim 1, wherein said deleting of said first initialization method is preformed while at least one other method associated with said Java class is loaded by said class loader of said Java virtual machine.

3. A method as recited in claim 1, wherein said deleting of said first initialization method from said memory portion operates to overwrite said memory portion with a second initialization method associated with a second Java class.

4. A method as recited in claim 1,
   wherein said first initialization method is executed only when said monitor is in said first state; and
   wherein said deleting of said first initialization method from said memory portion by said Java class loader operates to overwrite said memory portion with a second initialization method associated with a second Java class when said monitor is in said second state.

5. A method as recited in claim 1,
   wherein said memory portion is a buffer of a predetermined size; and
   wherein said buffer is allocated in a local memory portion of said Java class loader.

6. A Java computing environment comprising:
   a Java virtual machine suitable for loading and execution of Java class files;
   a Java class loader operating to:
      load a first initialization method associated with a first Java class into a memory portion of said Java virtual machine, said first initialization method capable of initializing said first Java class when executed;
      set a monitor suitable for synchronization to a first state when said first initialization method has been loaded, wherein the monitor is usable as a synchronization mechanism to allow the Java virtual machine to know when the first initialization method has been loaded and is ready for execution;
      execute said first initialization method after said first initialization method has been loaded into said memory portion of said Java virtual machine, thereby initializing said first Java class;
      after the first initialization method has been executed, setting said monitor to a second state when said first initialization method has been executed; and
      delete said first initialization method from said memory portion, based upon said monitor being in said second state, after said execution of said first initialization method has been completed, whereby the first initialization method is deleted independent of the loaded class.

7. A Java computing environment as recited in claim 6, wherein said deleting of said first initialization method is performed by said class loader while at least one other method associated with said Java class is loaded by said virtual machine.

8. A Java computing environment as recited in claim 6, wherein said deleting of said first initialization method from said memory portion operates to overwrite said memory portion with a second initialization method associated with a second Java class.

9. A Java computing environment as recited in claim 6,
   wherein said first initialization method is executed only when said monitor is in said first state; and
   wherein said deleting of said first initialization method from said memory portion by said class loader operates to overwrite said memory portion with a second initialization method associated with a second Java class when said monitor is in said second state.

10. A Java computing environment as recited in claim 9, wherein said memory portion is a buffer of a predetermined size.

11. A Java computing environment as recited in claim 9, wherein said memory portion is a buffer of a predetermined size; and wherein said buffer is allocated in a local memory portion of said Java class loader.

12. A computer readable medium including computer program code for initializing Java classes suitable for loading by a Java virtual machine operating in a Java computing environment; said computer readable medium comprising:

computer readable code for loading, by a Java class loader, a first initialization method associated with a first Java class into a memory portion of said Java virtual machine, said first initialization method capable of initializing said first Java class when executed;

computer readable code for setting a monitor suitable for synchronization to a first state when said first initialization method has been loaded, wherein the monitor is usable as a synchronization mechanism to allow the Java virtual machine to know when the first initialization method has been loaded and is ready for execution;

computer readable code for executing said first initialization method after said first initialization method has been loaded into said memory portion of said Java virtual machine; thereby initializing said first Java class;

computer readable code for, after the first initialization method has been executed, setting said monitor to a second state when said first initialization method has been executed; and computer readable code for, by the Java class loader, deleting said first initialization meted from said memory portion, based upon said monitor being in said second state, after said execution of said first initialization method has been completed, whereby the first initialization method is deleted independent of the loaded class.

13. A computer readable medium as recited in claim 12, wherein said deleting of said first initialization method is performed while at least one other method associated with said Java class is loaded by said class loader of said virtual machine.

14. A computer readable medium as recited in claim 12, wherein said deleting of said first initialization method from said memory portion operates to overwrite said memory portion with a second initialization method associated with a second Java class.

15. A computer readable medium as recited in claim 12, wherein said memory portion is a buffer of a predetermined size; and wherein said buffer is allocated in a local memory portion of said Java class loader.

* * * * *